G. W. FULLER.
Submarine Lantern.

No. 37,959.

2 Sheets—Sheet 1.

Patented March 24, 1863.

Witnesses:

Inventor:

G. W. FULLER.
Submarine Lantern.

No. 37,959.

2 Sheets—Sheet 2.

Patented March 24, 1863.

Witnesses:
R. H. Eddy
F. P. Hale Jr

Inventor:
Geo. W. Fuller

UNITED STATES PATENT OFFICE.

GEORGE W. FULLER, OF CAMBRIDGEPORT, MASSACHUSETTS.

IMPROVEMENT IN SUBMARINE LANTERNS.

Specification forming part of Letters Patent No. 37,959, dated March 24, 1863.

*To all whom it may concern:*

Be it known that I, GEORGE W. FULLER, a citizen of the United States of America, and a resident of Cambridgeport, in the county of Middlesex and State of Massachusetts, have invented a new and useful or Improved Submarine Lantern, to be used in explorations beneath the surface of the ocean or any other large body of water; and I do hereby declare the same to be fully described in the following specification, and represented in the accompanying drawings.

In making my invention I have sought to produce a lantern which when in use, at whatever distance below the surface of the sea or a body of water in which it may be immersed, may have a pressure of air within it equal to or about equal to the pressure of the water on its external surface, the same enabling me to construct a lantern of little strength and weight, comparatively speaking, one easily handled by a marine diver while in the water and below the surface thereof.

Submarine lanterns, as heretofore made, have been furnished with an air-induction conduit and an air-eduction pipe, both of which during use of the lantern reached from it to and above the surface of the water. With a lantern of this character, and while in use, the pressure of the water on its external surface so far exceeds the pressure of air within the body or case as to require the said body to be made of very strong materials and with great care, to prevent its collapse, as well as leakage of water into it. In my improved lantern the pressure of the air within it operates favorably to prevent the entrance of water at any of the joints of the lantern, and, furthermore, should any water enter the lantern by the air and smoke eduction passage, such water will be caught in a suitable receiver, and by it be prevented from falling on the hot glass chimney, and thereby causing either breakage of the latter or the conversion of such water into vapor and the deposit thereof on the reflector and the glass window of the lantern.

In making my invention I have also sought to so construct the lantern as to prevent from either cause deposits of vapor on the inner surface of the glass window or part of its case, as when such take place they greatly impair the illuminating power of the lantern.

Figure 1:
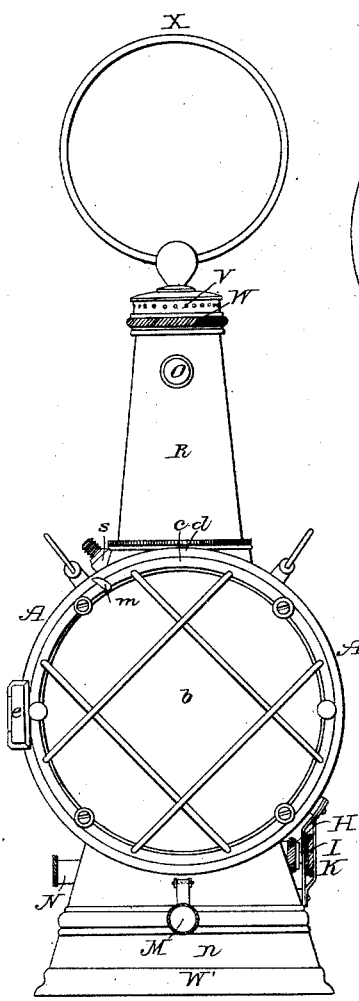
Figure 6:
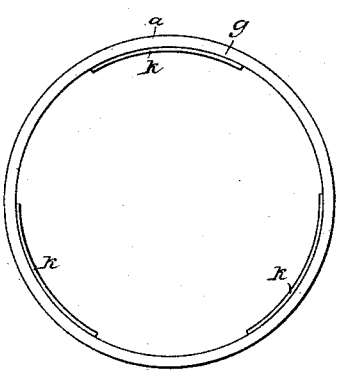
Figure 2:
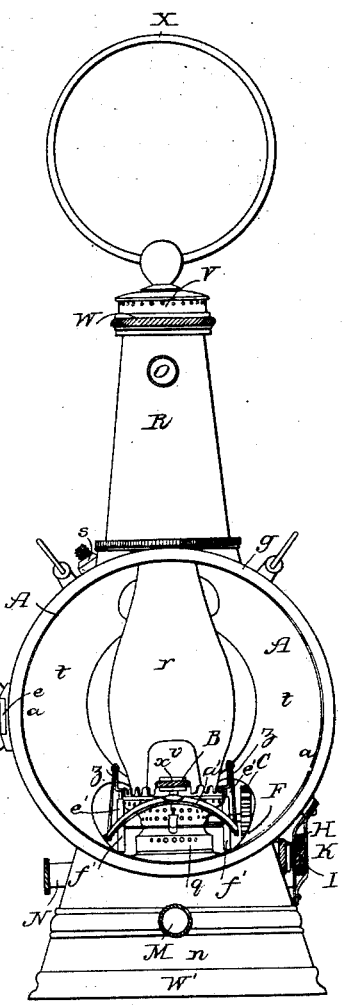
Figure 3:
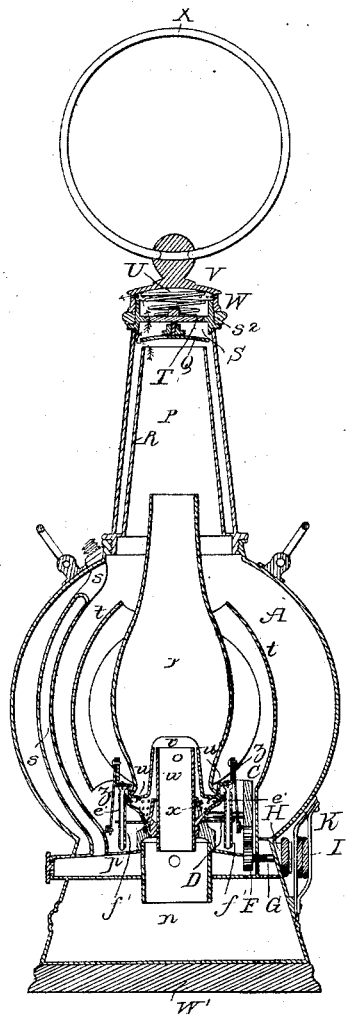
Figure 4:
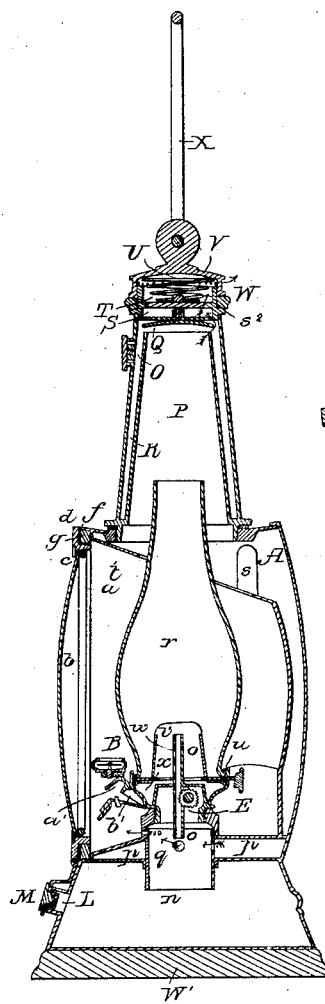

Of the drawings above mentioned, Figure 1 is a front view of the lantern as closed. Fig. 2 is a front view of it as open. Figs. 3 and 4 are vertical sections of it, taken in planes at right angles to each other.

Figure 8:
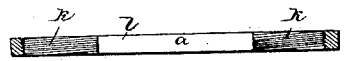
Figure 5:
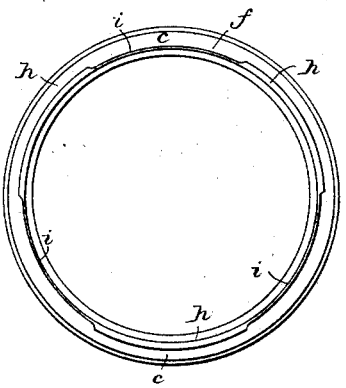

In the said drawings, A denotes the case or body of the lantern, it being constructed with a window-opening, *a*, in its front, such opening being provided with a transparent door or window, *b*. This window, as shown in the drawings, is a concavo-convex disk of glass, and is inserted or fixed in an annulus or circular frame, *c*, which is concentric with and arranged within another ring, *d*, which is hinged, as shown at *e*, to the lantern-case. This frame or ring *c* is to be so adapted to the ring *d* as to be capable of being turned or partially revolved therein, in order that its screw arcs or sections may be either engaged with or disengaged from those of the opening *a*, as circumstances may require. The annular frame *c* is first formed with a male screw, to screw into a female screw formed in the rim or inner edge of the opening *a*, and so as to force the ring *d* or an annular washer, *f*, firmly against the circular part *g* surrounding the opening *a*. Afterward each of the screws has the turns of its threads removed from equal arcs of its circumference—that is to say, every other arc of sixty degrees of the turn of the threads of each screw is to be filed or cut away, so that of each screw there will be left only three equal arc portions of sixty degrees each, they being situated at equal distances asunder, the same being, as shown in Figs. 5, 6, 7, and 8 of the drawings, wherein *h h h* are the screw-arcs of the periphery of the male screw-ring, while *i i i* are the spaces between them, *k k k* being the screw-arcs of the female screw of the opening *a*, while *l l l* are the open spaces between them. Of these last-mentioned figures, the first two are front views of the ring *c* and the opening *a*, while Fig. 7 is a side view of the ring, and Fig. 8 is a transverse section of the mouth of the opening *a*.

On closing the window of the lantern-case the screw-arcs of it will be caused to pass into the spaces between the screw-arcs of the opening, and in such manner that when the ring *c* is put in partial revolution the several screw-arcs of it will at once be engaged with or be screwed into those of the opening. In this way a partial revolution of the ring *c* suffices to firmly close the window and saves several entire revolutions of it, which would be necessary were entire male and female screws used, and, furthermore, the screw-arcs enable the window to be hinged to the opening $a$, in which case it is prevented from dropping off the lantern-case and being lost in the water, an accident which is liable to happen unless it be connected by a hinge or some equivalent. When a projection, $m$, on the ring $c$ is against the hinge of the window-frame, the screw-arcs will be in a proper position for the window to be closed.

The oil-chamber of the lamp of the lantern is shown at $n$. The wick-tube $o$ extends upward from the top of such chamber and through an auxiliary chamber, $p$, which is arranged immediately over the oil-chamber and about the wick-tube. The front part of that portion of the said chamber $p$ which is over the wick-tube is either perforated with one hole or a series of holes, as seen at $q$, such hole or holes being arranged in such manner as to cause air while issuing from them and the chamber to pass directly against the inner surface of the glass window $b$, or upward between the same and the chimney $r$ of the lamp. The object of this is to prevent condensation of moisture upon the inner surface of the glass window. The air-induction pipe for supplying air to the lantern by means of an air-pump is to be coupled on a pipe, $s$, which is situated within the lantern-case and in rear of the reflector $t$ and enters the chamber $p$. The air when issuing from such chamber is about at the temperature of the surrounding water, and if blown upward against the inner surface of the glass window or between the same and the glass chimney of the burner will intercept the heat radiated from the front part of the chimney, and will operate in other respects to prevent condensation of vapor on the inner surface of the glass window. Without the aerial current being so introduced with respect to the inner surface of the glass window, it has been found that a formation of vapor will often result and operate to intercept the light, which would otherwise pass through the glass window.

The air after being introduced into the body of the lantern will flow into the perforated base $x$, which receives and supports the chimney and deflector supporter $u$, and from thence such air will pass into the conical deflector $v$ and against the wick $w$, and from thence into and through the glass chimney $r$.

In order that access may be readily obtained to the wick, either for inflaming or trimming it or for extinguishing its flame, as circumstances may require, the glass chimney and the conical deflector are supported within an annular ring or frame, $u$, which is arranged in the upper part of the base $x$ and has applied to it by means of two connecting rods or bars, $z$ $z$, a forked lever, $a'$, whose fulcrum is seen at $b'$. By pressing on the tail or shorter arm, $c'$, of the said lever the elevation of the chimney and the deflector supporter of the base may be effected. For the purpose of causing the chimney and deflector supporter to rise vertically it is provided with projections $e'$ $e'$, which extend downward from it and into guide-tubes $f'$ $f'$, fastened to opposite sides of the said base part $x$.

A small mariner's compass, B, is affixed on the arm $a'$ and so that the light from the flame of the wick may strike upon its magnetic needle, the compass also being so arranged as to enable the needle to be seen by a person while looking into the glass window of the lantern. This compass serves to guide the diver in his movements, while he with the lantern may be beneath the surface of a body of water.

In order to enable the diver, while the lantern may be submerged, to adjust the wick so as to regulate the height of the flame thereof, there is a spur, C, fixed on the shaft or rod D of the wick-elevator E. A pinion, F, engages with the spur-gear, and is fixed on a shaft, G, which passes through a stuffing-box, H, and to the outside of the lamp, and carries a milled nut, I, which may be protected more or less by a guard, K, arranged as shown in the drawings. By applying the thumb and index-finger of one hand to the nut I the diver can turn the shaft and thereby effect either the raising or lowering of the wick, as circumstances may require.

The oil-reservoir of the lamp is provided with a filling-opening, L, which is furnished with a screw-plug, M, the whole being arranged as shown in the drawings. Furthermore, the lantern is furnished with two other such openings, N O, which have such screw-stoppers. One of these openings is placed at the lower and the other at the upper part of such body, as shown in the drawings. The purpose of these openings is to cause a current of air to pass through the lantern-case at such times as the lantern may be out of water and exposed to the heat of the sun. Were it not for these openings the air within the lamp would be likely to become heated by the rays of the sun and to such an extent that vapor therefrom would be caused to condense on the inner surface of the glass window. By unscrewing the stoppers of the openings N O a current of air will flow through the lamp and thus the said condensation of moisture will be prevented.

The glass chimney of the burner opens at its top into the base of a metallic tube or chimney, P, whose upper end is covered by a door or cap, Q, having a diameter larger than that of the said upper end and being raised a short distance above such upper end. There is also a water-receiving or guard chamber, R, extending around the chimney P and being provided with a valve-seat, S, and a valve, T, at its top. This valve is forced down upon its seat by a light spring, U, arranged within a perforated cap, V, which is screwed to the top part of the lantern and held in place by a check-nut, W, which screws on the screw $s^2$, to which the cap is adapted. A ring or handle, X, fixed to the cap serves to enable a person to readily lift the lantern or sustain it by his hand.

The check-nut, combined with the handle, the cap, and the screws of the latter, serves not only to prevent the cap from becoming unscrewed while the lantern may be submerged, but enables the diver to adjust and fix the handle, that while the lantern may be hanging on his arm or to his person the light of the lamp may be caused to flow in such direction as may be desirable.

The purpose of the dome Q and the chamber R is to intercept any water which may flow or leak through the valve-seat and which might by dropping upon the glass chimney while in a heated state cause either breakage of it or a sudden formation of vapor within the body of the lantern.

The spent gases and smoke arising from the flame of the wick will escape through the valve-opening at the upper part of the lantern and will pass out of the holes of the cap V and into the water when the lantern may be submerged. For the purpose of causing the lantern to readily sink in water a weight, W', may be affixed to the lower part of it.

Having thus described my submarine lantern, what I claim in relation thereto is as follows:

1. A lantern as made or provided with an air-induction conduit and with a valve-opening and valve arranged with respect to the body of the said lantern and for the purpose of supplying air to the lamp thereof and of discharging the smoke and spent products of combustion into the water when the lantern may be submerged therein, as specified.

2. The combination for applying the glass window $b$ to the body A of the lantern and so as to enable such window not only to be closed with a water-tight joint, but to be opened on a hinge for the purpose, as described, the same consisting of the rings $c\ d$, the hinge and the sections of screws connected with or applied to the rings and the lantern-case, substantially as specified.

3. The combination and arrangement of the air-ventilating devices N O and their screw-stoppers or their mechanical equivalents with the lantern-body or case, the same being for the purpose set forth.

4. The arrangement or combination of the air inlet or inlets $q$ with the lamp and glass window in manner so that the air forced into the lantern-case may be on its entrance therein discharged, either against the inner surface of the glass window or upward between the same and the flame or chimney of the lamp, the same being for the purpose hereinbefore set forth.

5. The combination and arrangement of mechanism for raising the glass chimney and the conical deflector in order that access may be had to the wick, the same consisting of the frame $u$, the forked lever $a'$, and the connecting-bars $z\ z$, the said frame $u$ being provided with guides, as specified.

6. The arrangement of the mariner's compass—viz., within the lantern-body and with respect to the lamp and the window of the said body or on the lever $a'$, as specified.

7. The combination and arrangement of the water-receiving and guard chamber R and chimney cap or dome Q with the opening P and the valve-seat S and valve T, applied or arranged with respect to the lamp and the lantern-body, substantially as specified.

8. The combination of the check-nut W with the handle X, the cap V, and the screws by which the latter is connected to the upper part of the lantern-case.

GEO. W. FULLER.

Witnesses:
R. H. EDDY,
F. P. HALE, Jr.